(12) United States Patent
Uchida

(10) Patent No.: US 11,067,709 B2
(45) Date of Patent: Jul. 20, 2021

(54) RADIATION POSITION DETECTION METHOD, RADIATION POSITION DETECTOR, AND PET APPARATUS

(71) Applicant: HAMAMATSU PHOTONICS K.K., Hamamatsu (JP)

(72) Inventor: Hiroshi Uchida, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 266 days.

(21) Appl. No.: 16/128,716

(22) Filed: Sep. 12, 2018

(65) Prior Publication Data

US 2019/0079204 A1   Mar. 14, 2019

(30) Foreign Application Priority Data

Sep. 13, 2017   (JP) .............................. JP2017-175764

(51) Int. Cl.
  *G01T 1/29*   (2006.01)
  *G01T 1/20*   (2006.01)
  *G01T 1/164*   (2006.01)

(52) U.S. Cl.
  CPC .......... *G01T 1/2985* (2013.01); *G01T 1/1647* (2013.01); *G01T 1/2018* (2013.01)

(58) Field of Classification Search
  CPC ... G01T 1/2985; G01T 1/1647; G01T 1/2018; G01T 1/202; G01T 1/248
  See application file for complete search history.

(56) References Cited

U.S. PATENT DOCUMENTS

| | | | | |
|---|---|---|---|---|
| 2004/0178347 A1* | 9/2004 | Murayama | ............ | G01T 1/2008 250/367 |
| 2010/0327168 A1* | 12/2010 | Yamada | ................. | A61B 6/037 250/362 |
| 2018/0180745 A1* | 6/2018 | Uchida | ................. | G01T 1/2985 |

FOREIGN PATENT DOCUMENTS

JP            6012475 B2    10/2016

\* cited by examiner

*Primary Examiner* — David P Porta
*Assistant Examiner* — Meenakshi S Sahu
(74) *Attorney, Agent, or Firm* — Faegre Drinker Biddle & Reath LLP

(57) ABSTRACT

A radiation position detection method includes: a first step of calculating a first centroid position in an incident direction regarding positions where scintillation light is detected, on the basis of electrical signals; and a second step of specifying, on the basis of a first table showing first identification regions for identifying the plurality of segments, and the first centroid position, the segment that initially generates the scintillation light. The first identification region includes a first region, a second region, and a third region. In the second step, in a case where the first centroid position is located in the first region or the third region, the first segment is specified as the segment that initially generates the scintillation light, and in a case where the first centroid position is located in the second region, the second segment is specified as the segment that initially generates the scintillation light.

18 Claims, 12 Drawing Sheets

RADIATION POSITION DETECTION METHOD, RADIATION POSITION DETECTOR, AND PET APPARATUS

TECHNICAL FIELD

This disclosure relates to a radiation position detection method, a radiation position detector, and a PET apparatus.

BACKGROUND

There may be cases where a radiation position detector based on the Depth Of Interaction (DOI) technology is used in a Positron Emission Tomography (PET) apparatus or the like. As such a radiation position detector, there is known a radiation position detector including a plurality of scintillator portions having a plurality of segments which are arranged along an incident direction (depth direction) of radiation and absorb the radiation and generate scintillation light, and a plurality of light detectors arranged at both ends of each of the scintillator portions (for example, Japanese Patent No. 6012475). In such a radiation position detector, the segment that generates the scintillation light is specified on the basis of an electrical signal output from each of the light detectors.

SUMMARY

In the radiation position detector as described above, there may be cases where scintillation light is generated by different segments as radiation (for example, γ rays or X-rays) causes Compton scattering. In this case, the segment that initially generates the scintillation light has to be specified. However, when the segment is specified on the basis of a centroid position of positions where the scintillation light is detected, there is concern that the segment that generates scintillation light after the scattering of the radiation may be specified other than the segment that initially generates the scintillation light. The reason is that in a case where radiation with a relatively high energy is used as in PET measurement, the intensity of the scintillation light generated at the photoelectric absorption point after the scattering of the radiation due to Compton scattering tends to be higher than the intensity of the scintillation light initially generated at the scatter point.

An object of this disclosure is to provide a radiation position detection method, a radiation position detector, and a PET apparatus capable of accurately specifying a segment that initially generates scintillation light (namely a first interaction segment).

According to an embodiment of this disclosure, a radiation position detection method is performed by a radiation position detector including a plurality of scintillator portions which have a plurality of segments that are arranged along an incident direction of radiation and absorb the radiation and generate scintillation light, and are two-dimensionally arranged on a plane intersecting the incident direction, and a plurality of light detectors which are arranged to correspond to the plurality of scintillator portions and output electrical signals in response to an intensity of the scintillation light. The radiation position detection method includes: a first step of calculating a first centroid position in the incident direction regarding positions where the scintillation light is detected, on the basis of the electrical signals; and a second step of specifying, on the basis of a first table showing first identification regions for identifying the plurality of segments, and the first centroid position, the segment that initially generates the scintillation light. The first identification region includes a first region corresponding to a first segment which is one of the plurality of segments, a second region corresponding to a second segment adjacent to the first segment among the plurality of segments, on a side opposite to an incident side of the radiation with respect to the first segment, and a third region that is located on the second region side between the first region and the second region and corresponds to the first segment. In the second step, in a case where the first centroid position is located in the first region or the third region, the first segment is specified as the segment that initially generates the scintillation light, and in a case where the first centroid position is located in the second region, the second segment is specified as the segment that initially generates the scintillation light.

According to the embodiment of this disclosure, a radiation position detector and a PET apparatus includes: a plurality of scintillator portions which have a plurality of segments that are arranged along an incident direction of radiation and absorb the radiation and generate scintillation light, and are two-dimensionally arranged on a plane intersecting the incident direction; a plurality of light detectors which are arranged to correspond to the plurality of scintillator portions and output electrical signals in response to an intensity of the scintillation light; a calculation unit which calculates a first centroid position in the incident direction regarding positions where the scintillation light is detected, on the basis of the electrical signals; and a specifying unit which specifies the segment that initially generates the scintillation light, on the basis of a first table showing first identification regions for identifying the plurality of segments, and the first centroid position. The first identification region includes a first region corresponding to a first segment which is one of the plurality of segments, a second region corresponding to a second segment adjacent to the first segment among the plurality of segments, on a side opposite to an incident side of the radiation with respect to the first segment, a third region that is located on the second region side between the first region and the second region and corresponds to the first segment. In a case where the first centroid position is located in the first region or the third region, the specifying unit specifies the first segment as the segment that initially generates the scintillation light, and in a case where the first centroid position is located in the second region, the specifying unit specifies the second segment as the segment that initially generates the scintillation light.

In the radiation position detection method, the radiation position detector, and the PET apparatus according to the embodiment of this disclosure, in a case where scintillation light is generated only by the first segment, since the first centroid position is located in the first region corresponding to the first segment, the first segment is correctly specified as the segment that initially generates the scintillation light. Similarly, even in a case where scintillation light is generated only by the second segment, the second segment is correctly specified as the segment that initially generates the scintillation light. Here, when radiation causes Compton scattering in the first segment and scintillation light is generated by each of the first segment and the second segment, the intensity of the scintillation light generated by the second segment tends to be higher than the intensity of the scintillation light generated by the first segment. Therefore, the first centroid position tends to be located in the third region located on the second region side between the first region and the second region. Even in this case, since the third region corresponds to the first segment, the first segment is correctly specified as the segment that initially generates the scintillation light. Therefore, with the radiation position detection method, the radiation position detector, and the PET apparatus of the embodiment of this disclosure, the segment that initially generates scintillation light can be accurately specified.

The first table may further include a fourth region located on the first region side between the first region and the second region. In the second step, in a case where the first centroid position is located in the fourth region, the first segment may be specified as the segment that initially generates the scintillation light, or specification of the segment that initially generates the scintillation light is not performed. As an example of a case where the first centroid position is located in the fourth region, a case where Compton scattering occurs twice or more in one segment, a case where Compton scattering occurs in two segments with one or more segments interposed therebetween, or the like is considered. For example, in a case where scintillation light is initially generated by the first segment, Compton scattering then occurs in the same first segment, and thereafter Compton scattering further occurs in the second segment, the first centroid position may be located in the fourth region. Even in this case, the first segment is correctly specified as the segment that initially generates the scintillation light. That is, the segment that initially generates the scintillation light can be more accurately specified. On the other hand, in a case where Compton scattering occurs in the two segments with one or more segments interposed therebetween, it is difficult to specify the segment that initially generates the scintillation light. In consideration of this case, in a case where the first centroid position is located in the fourth region, the specification of the segment that initially generates the scintillation light is not performed, thereby suppressing erroneous specification of the segment that initially generates the scintillation light. As a result, the segment that initially generates the scintillation light can be more accurately specified.

In the first step, a second centroid position on the plane intersecting the incident direction may be calculated regarding the positions where the scintillation light is detected, on the basis of the electrical signals, and in the second step, the scintillator portion having the segment that initially generates the scintillation light may be specified on the basis of a second table showing second identification regions for identifying the plurality of scintillator portions and the second centroid position. The second identification region may include a fifth region corresponding to a first scintillator portion which is one of the plurality of scintillator portions, a sixth region corresponding to a second scintillator portion adjacent to the first scintillator portion among the plurality of scintillator portions, a seventh region which is located on the sixth region side between the fifth region and the sixth region and corresponds to the first scintillator portion, and an eighth region which is located on the fifth region side between the fifth region and the sixth region and corresponds to the second scintillator portion. In the second step, in a case where the second centroid position is located in the fifth region or the seventh region, the first scintillator portion may be specified as the scintillator portion having the segment that initially generates the scintillation light, and in a case where the second centroid position is located in the sixth region or the eighth region, the second scintillator portion may be specified as the scintillator portion having the segment that initially generates the scintillation light.

With the configuration described above, since in a case where scintillation light is generated only by the first scintillator portion, since the second centroid position is located at the fifth region corresponding to the first scintillator portion, the first scintillator portion is correctly specified as the scintillator portion having the segment that initially generates the scintillation light. Similarly, even in a case where scintillation light is generated only by the second scintillator portion, the second scintillator portion is correctly specified as the scintillator portion having the segment that initially generates the scintillation light. Here, when radiation causes Compton scattering in the first scintillator portion and scintillation light is generated by each of the first scintillator portion and the second scintillator portion, the intensity of the scintillation light generated by the second scintillator portion tends to be higher than the intensity of the scintillation light generated by the first scintillator portion. Therefore, the second centroid position of the positions where the scintillation light is detected tends to be located in the seventh region located on the sixth region side between the fifth region and the sixth region. Even in this case, since the seventh region corresponds to the first scintillator portion, the first scintillator portion is correctly specified as the scintillator portion having the segment that initially generates the scintillation light. Similarly, even in a case where radiation causes Compton scattering in the second scintillator portion and scintillation light is generated by each of the first scintillator portion and the second scintillator portion, the second scintillator portion is correctly specified as the scintillator portion having the segment that initially generates the scintillation light. Accordingly, the scintillator portion having the segment that initially generates the scintillation light can be accurately specified.

A light shielding layer that shields the scintillation light may be provided between the plurality of scintillator portions. Accordingly, a leak of scintillation light from the scintillator portion that generates the scintillation light into a scintillator portion adjacent to the scintillator portion can be prevented, and thus the scintillator portion having the segment that initially generates the scintillation light can be more accurately specified.

Each of the plurality of light detectors may be connected to a resistor chain. Accordingly, each of the first centroid position and the second centroid position can be easily and more accurately calculated.

A light scattering portion formed through laser irradiation may be provided between the plurality of segments. Accordingly, for example, compared to a case where each of the scintillator portions is configured by joining a plurality of scintillator blocks to each other while allowing light scattering members, or members having different optical properties (for example, refractive indices) from the scintillator portion to be interposed therebetween, each of the scintillator portions can be manufactured easily and with high dimensional accuracy.

According to the embodiment of this disclosure, a segment that initially generates scintillation light can be more accurately specified.

DETAILED DESCRIPTION

Figure 1A:
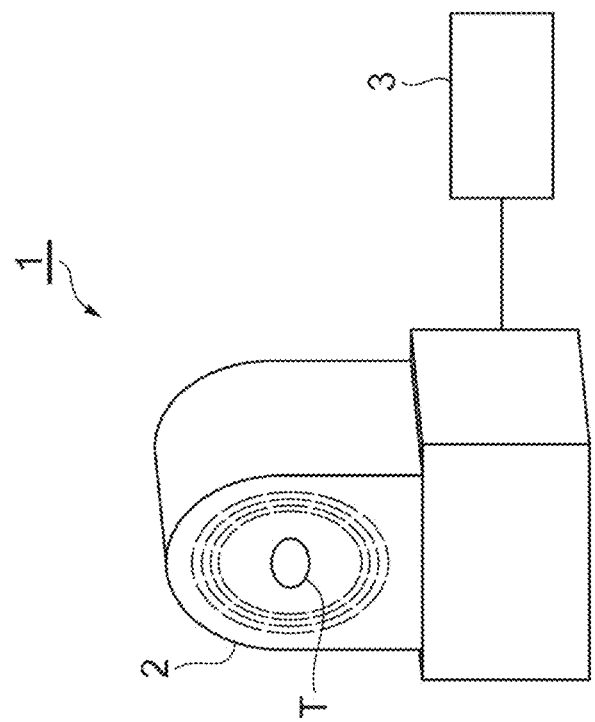
FIG. 1A is a schematic view of a PET apparatus of an embodiment.

Hereinafter, an embodiment of this disclosure will be described in detail with reference to the accompanying drawings. In the description of the drawings, like elements are denoted by like reference numerals, and overlapping descriptions will be omitted.

Figure 1B:
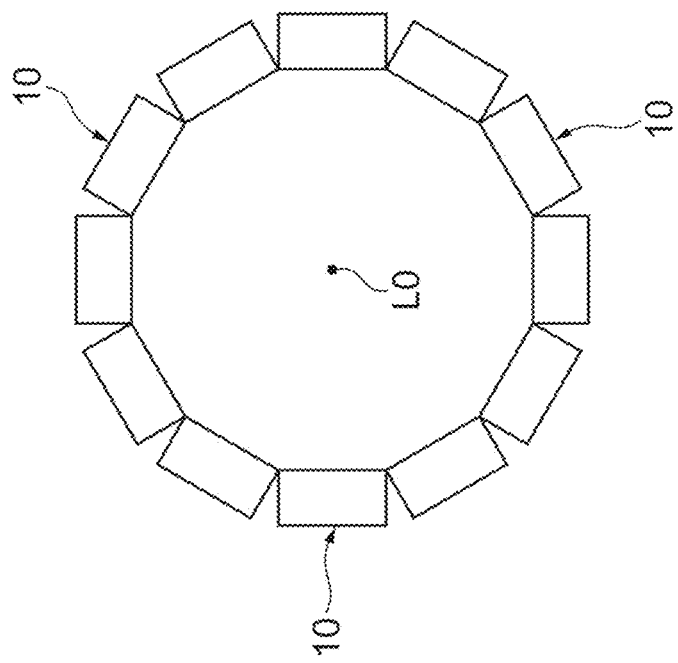
FIG. 1B is a schematic view of a detector ring of the PET apparatus illustrated in FIG. 1A.

As illustrated in FIG. 1A, a PET apparatus 1 includes a bed (not illustrated) on which a subject T is placed, a gantry 2 having an opening with a circular section shape, and an image processing unit 3 to which data detected by a detector ring in the gantry 2 is transmitted. As illustrated in FIG. 1B, in the detector ring in the gantry 2 of the PET apparatus 1, on a circumference having a predetermined line L0 as the center line, a plurality of radiation position detectors 10 are arranged in a ring shape while being in contact with one another. The PET apparatus 1 is an apparatus that detects γ rays (radiation) emitted from the subject T to which a drug labeled with a positron-emitting radionuclide (a radioisotope emitting positrons) is administered. With the PET apparatus 1, a tomographic image of the subject T at a plurality of slice positions can be acquired.

Figure 2:
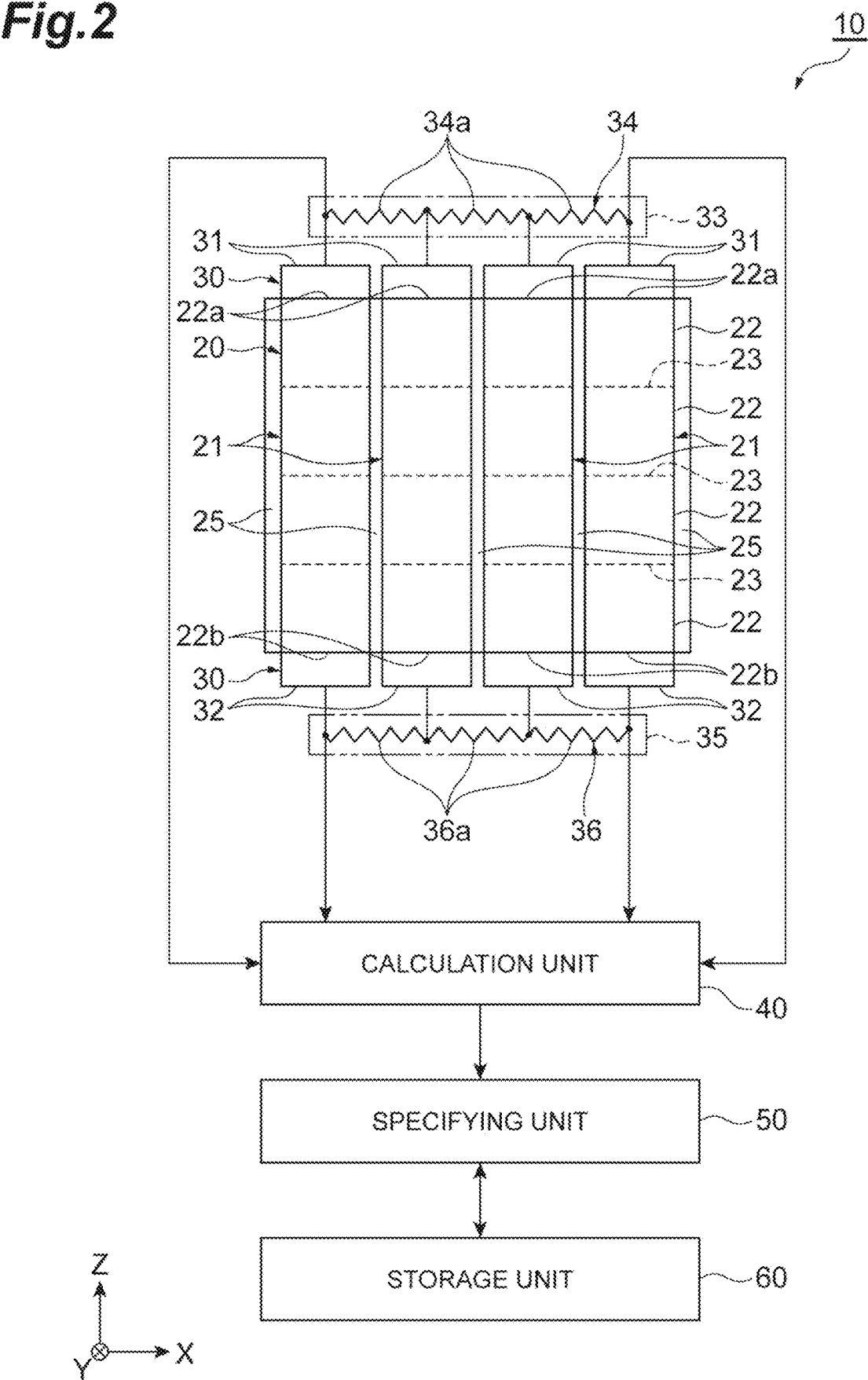
FIG. 2 is a configuration view of a radiation position detector of the embodiment.

As illustrated in FIG. 2, the radiation position detector 10 includes a scintillator array 20, a light detector array 30, a calculation unit 40, a specifying unit 50, and a storage unit 60. In FIG. 2, the scintillator array 20 and the light detector array 30 are illustrated in a side view, and the calculation unit 40, the specifying unit 50, and the storage unit 60 are illustrated in a block diagram.

The scintillator array 20 includes a plurality of scintillator portions 21 and light shielding layers 25. The plurality of scintillator portions 21 are arranged two-dimensionally (for example, in a matrix form) on an XY plane parallel to an X-axis direction and a Y-axis direction. Each of the scintillator portions 21 absorbs γ rays and generates scintillation light. As an example, each of the scintillator portions 21 has a quadrangular prism shape having, as its longitudinal direction, a Z-axis direction perpendicular to the X-axis direction and the Y-axis direction. The Z-axis direction is a direction intersecting the XY plane, and corresponds to an incident direction of γ rays.

Each of the scintillator portions 21 has a plurality of (for example, four) segments 22 arranged along the Z-axis direction. The plurality of segments 22 are divided from each other by light scattering portions 23. For example, each of the segments 22 has a cubic shape. Each of the light scattering portions 23 allows a portion of the scintillation light that is incident onto the corresponding light scattering portion 23 to be scattered and thus attenuates the intensity of the scintillation light that passes through the corresponding light scattering portion 23. The light scattering portion 23 has, for example, a flat surface shape intersecting the Z-axis direction. For example, the light scattering portions 23 are arranged to have the same interval therebetween in the Z-axis direction. The light scattering portions 23 are arranged to overlap each other when viewed in the Z-axis direction.

Each of the light scattering portions 23 is formed by reforming a portion of a crystal body forming each of the scintillator portions 21. For example, Each of the light scattering portions 23 is formed by forming a plurality of micro voids on a corresponding portion. The reforming is performed by laser light irradiation. More specifically, laser light having a light-transmitting property is focused in the crystal body forming each of the scintillator portions 21 and the focal point of the laser light is relatively moved along a predetermined plane (for example, a surface parallel to the XY plane) in the crystal body. Accordingly, light absorption is caused at a portion, in the crystal body, that is coincident with the focal point of the laser light such that a reformed region is formed along the predetermined plane in the crystal body. In a case where the laser light is pulsed laser light, a single reformed spot is formed by the irradiation of a single pulse of the laser light. As a plurality of reformed spots are arranged along the predetermined plane in the crystal body, a reformed region is formed. The reformed region formed as described above acts as the light scattering portion 23.

The light shielding layers 25 are provided between the plurality of scintillator portions 21 and on the outer surfaces of the plurality of scintillator portions 21. That is, the light shielding layers 25 cover the scintillator portions 21 excluding end surfaces 22a to which first light detectors 31 are optically connected, and end surfaces 22b to which second light detectors 32 are optically connected. The light shielding layer 25 shields the scintillation light generated by the scintillator portions 21 while passing the γ rays. For example, the light shielding layer 25 is a Teflon (registered trademark) tape, a high reflective multilayer film or the like, and is configured by being inserted between the scintillator portions 21.

The light detector array 30 includes a plurality of the first light detectors 31, a plurality of the second light detectors 32, a first output extraction portion 33, and a second output extraction portion 35. The plurality of first light detectors 31 and the plurality of second light detectors 32 are arranged to correspond to the plurality of scintillator portions 21. More specifically, the plurality of first light detectors 31 are arranged to respectively correspond to the plurality of scintillator portions 21 in one-to-one correspondence. The first light detector 31 is joined to the end surface 22a of the segment 22 located at an end portion on an incident side of γ rays in a corresponding scintillator portion 21. The end surface 22a is an end surface on the incident side of γ rays in the segment 22. The first light detector 31 detects the scintillation light generated by the corresponding scintillator portion 21 via the end surface 22a and outputs an electrical signal in response to the intensity of the scintillation light. Similarly, the plurality of second light detectors 32 are arranged to respectively correspond to the plurality of scintillator portions 21 in one-to-one correspondence. The second light detector 32 is joined to the end surface 22b of the segment 22 located at an end portion on a side opposite to the incident side of γ rays in a corresponding scintillator portion 21. The end surface 22b is an end surface on the side opposite to the incident side of γ rays in the segment 22. The second light detector 32 detects the scintillation light generated by the corresponding scintillator portion 21 via the end surface 22b and outputs an electrical signal in response to the intensity of the scintillation light. As an example, each of the first light detectors 31 and the second light detectors 32 is a Silicon Photomultiplier (SiPM) or a position-sensitive PMT, and outputs a pulsed electrical signal amplified in response to the intensity of the scintillation light.

The first output extraction portion 33 includes a first resistor chain 34. Each of the plurality of first light detectors 31 is connected to the first resistor chain 34. In the first resistor chain 34, the first light detectors 31 adjacent to each other in the X-axis direction are connected to each other via resistors 34a, the first light detectors 31 adjacent to each other in the Y-axis direction on one end side in the X-axis direction are connected to each other via resistors 34a, and the first light detectors 31 adjacent to each other in the Y-axis direction on the other end side in the X-axis direction are connected to each other via resistors 34a. The electrical signal output from each of the first light detectors 31 is extracted from each of both ends of a plurality of the resistors 34a connected in the Y-axis direction on one end side in the X-axis direction, and each of both ends of the plurality of resistors 34a connected in the Y-axis direction on the other end side in the X-axis direction. The second output extraction portion 35 includes a second resistor chain 36. Each of the plurality of second light detectors 32 is connected to the second resistor chain 36. In the second resistor chain 36, the second light detectors 32 adjacent to each other in the X-axis direction are connected to each other via resistors 36a, the second light detectors 32 adjacent to each other in the Y-axis direction on one end side in the X-axis direction are connected to each other via resistors 36a, and the second light detectors 32 adjacent to each other in the Y-axis direction on the other end side in the X-axis direction are connected to each other via resistors 36a. The electrical signal output from each of the second light detectors 32 is extracted from each of both ends of a plurality of the resistors 36a connected in the Y-axis direction on one end side in the X-axis direction, and each of both ends of the plurality of resistors 36a connected in the Y-axis direction on the other end side in the X-axis direction.

The calculation unit 40 is electrically connected to the first output extraction portion 33 and the second output extraction portion 35. The calculation unit 40 calculates a first centroid position in the Z-axis direction and a second centroid position on the XY plane regarding positions where scintillation light is detected, on the basis of the electrical signal extracted from each of the first output extraction portion 33 and the second output extraction portion 35. In a case where scintillation light is generated by any of the plurality of segments 22, a portion of the generated scintillation light reaches the end surface 22a, and the remainder reaches the end surface 22b. At this time, the scintillation light is attenuated by each of the light scattering portions 23. Therefore the ratio of the amounts of the light that reaches the end surface 22a and the end surface 22b is changed in stages depending on the segment 22 where the scintillation light is generated among the plurality of segments 22. The first centroid position is a centroid position obtained by calculating the ratio between the intensities of the electrical signals detected by each of the first light detectors 31 and each of the second light detectors 32 using the change in the amounts of light. That is, the first centroid position is a centroid position obtained by weighting the positions of each of the first light detectors 31 and each of the second light detectors 32 by the intensities of the electrical signals. The calculation unit 40 acquires electrical signals A1, A2, A3, and A4 extracted from the first output extraction portion 33, and electrical signals B1, B2, B3, and B4 extracted from the second output extraction portion 35. As an example, the calculation unit 40 calculates a ratio F1 by Formula (1) or Formula (2) below. The calculation unit 40 calculates the first centroid position on the basis of the ratio F1. AS equals A1+A2+A3+A4, and BS equals B1+B2+B3+B4.

[Formula 1]
$$F1 = \frac{BS}{AS + BS} \quad (1)$$

[Formula 2]
$$F1 = \frac{BS - AS}{AS + BS} \quad (2)$$

In a case where an electrical signal is output from one first light detector 31 and/or one second light detector 32 corresponding to one scintillator portion 21, the second centroid position is the position of the single first light detector 31 and/or the single second light detector 32. On the other hand, in a case where electrical signals are output from a plurality of the first light detectors 31 and/or a plurality of the second light detectors 32, the second centroid position is a centroid position obtained by weighting the position of each of the plurality of first light detectors 31 and/or the position of each of the plurality of second light detectors 32 by the intensities of the electrical signals. As an example, the calculation unit 40 calculates a ratio F2 and a ratio F3 by Formulas (3) and (4) or Formulas (5) and (6) below. The calculation unit 40 calculates the second centroid position in the X-axis direction on the basis of the ratio F2, and calculates the second centroid position in the Y-axis direction on the basis of the ratio F3.

[Formula 3]
$$F2 = \frac{(A1 + A3 + B1 + B3) - (A2 + A4 + B2 + B4)}{AS + BS} \quad (3)$$

[Formula 4]
$$F3 = \frac{(A1 + A2 + B1 + B2) - (A3 + A4 + B3 + B4)}{AS + BS} \quad (4)$$

[Formula 5]
$$F2 = \frac{A1 + A3 + B1 + B3}{AS + BS} \quad (5)$$

[Formula 6]
$$F3 = \frac{A1 + A2 + B1 + B2}{AS + BS} \quad (6)$$

The specifying unit 50 is electrically connected to the calculation unit 40. The specifying unit 50 specifies, on the basis of a first table (segment identification table) showing first identification regions for individually identifying the plurality of segments 22, and the first centroid position output from the calculation unit 40, the segment 22 that initially reacts with γ rays, that is, the segment 22 that initially generates the scintillation light. In a case where one segment 22 generates the scintillation light, the segment 22 that initially generates the scintillation light is the one segment 22. On the other hand, in a case where a plurality of the segments 22 generate scintillation light, the segment 22 that initially generates the scintillation light is the segment 22 that initially generates the scintillation light in terms of time among the plurality of segments 22. Here, an example of the first table will be described. For convenience of description, In FIG. 3A, a plurality of segment regions 22A respectively corresponding to the plurality of segments 22 are shown in a first table T1. However, the plurality of segment regions 22A do not need to be shown in the first table T1. Furthermore, one first table T1 may be provided for the scintillator array 20, or one first table T1 may be provided for each of the scintillator portions 21.

Figure 3A:
FIG. 3A is a view illustrating an example of a first table used in the radiation position detector illustrated in FIG. 2.
Figure 3B:
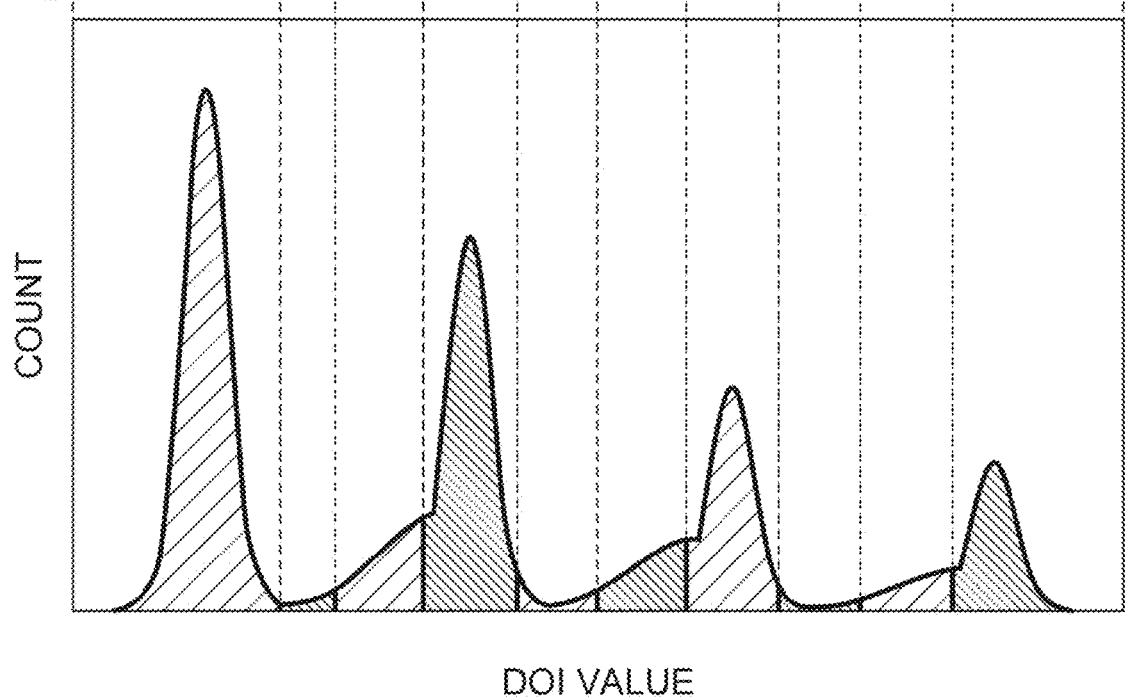
FIG. 3B is a view showing a histogram of DOI values.

FIGS. 3A and 3B show the relationship between a DOI histogram and the first table T1 when γ rays are caused to be incident from the left side. The vertical axis of the DOI histogram shown in FIG. 3B represents the count, and the horizontal axis corresponds to the DOI value (that is, first centroid position). Assuming that one segment region 22A shown on the leftmost side in FIG. 3A is referred to as a first segment region 221 and one segment region 22A adjacent to the right side of the first segment region 221 is referred to as a second segment region 222 and focusing on the first segment region 221 and the second segment region 222, in the first table T1, each region of a first region R1, a second region R2, a third region R3, and a fourth region R4 is shown as the first identification region. The first segment region 221 corresponds to a first segment which is one of the plurality of segments 22. The second segment region 222 corresponds to a second segment adjacent to the first segment on the side (that is, the end surface 22b side) opposite to the incident side of the γ rays (that is, the end surface 22a side) with respect to the first segment. Each region of the first identification region and each segment region 22A corresponds to the horizontal axis of the DOI histogram shown in FIG. 3B.

The first region R1 includes a distribution of the first centroid positions based on the scintillation light generated only by the first segment and corresponds to the first segment. The first region R1 is located at a part excluding the right end portion of the first segment region 221. The second region R2 includes a distribution of the first centroid positions based on the scintillation light generated only by the second segment and corresponds to the second segment. The second region R2 is located in the vicinity of the center of the second segment region 222. The third region R3 is located on the second region R2 side between the first region R1 and the second region R2, and is provided at the left end portion of the second segment region 222. The third region R3 corresponds to the first segment. The fourth region R4 is located on the first region R1 side between the first region R1 and the second region R2, and is provided at the right end portion of the first segment region 221. The fourth region R4 corresponds to the first segment. The fourth region R4 may also correspond to a background. That is, the fourth region R4 may not correspond to the segment 22. "Corresponds to" mentioned above indicates the association between the first centroid position and the segment 22 on the first table T1. For example, in a case where the first centroid position is located in the first region R1 or the third region R3, the first centroid position and the first segment are associated with each other by attaching a number (for example, 1) indicating the first segment to an address corresponding to the first centroid position on the first table T1. On the other hand, in a case where the first centroid position is located in the second region R2, the first centroid position and the second segment are associated with each other by attaching a number (for example, 2) indicating the second segment to an address corresponding to the first centroid position on the first table T1. In a case where the first centroid position is located in the fourth region R4, the first centroid position and the first segment are associated with each other by attaching a number (for example, 1) indicating the first segment to an address corresponding to the first centroid position on the first table T1, or the first centroid position and the segment 22 are not associated with each other by attaching a number (for example, 5) which does not indicate the segment 22 to an address corresponding to the first centroid position on the first table T1.

As described above, in each region of the first table T1, even when any one of the segment regions 22A excluding the rightmost segment region 22A is regarded as the first segment region 221, the relationship between the first region R1, the second region R2, the third region R3, and the fourth region R4 described above is established.

The specifying unit 50 specifies, on the basis of a second table (scintillator portion identification table) showing second identification regions for individually identifying the plurality of scintillator portions 21, and the second centroid position output from the calculation unit 40, the scintillator portion 21 having the segment 22 that initially generates the scintillation light. Here, an example of the second table T2 will be described. For convenience of description, In FIG. 4, a plurality of scintillator portion regions 21A respectively corresponding to the plurality of scintillator portions 21 are shown in the second table T2. However, the plurality of scintillator portion regions 21A do not need to be shown in the second table T2.

Figure 4:
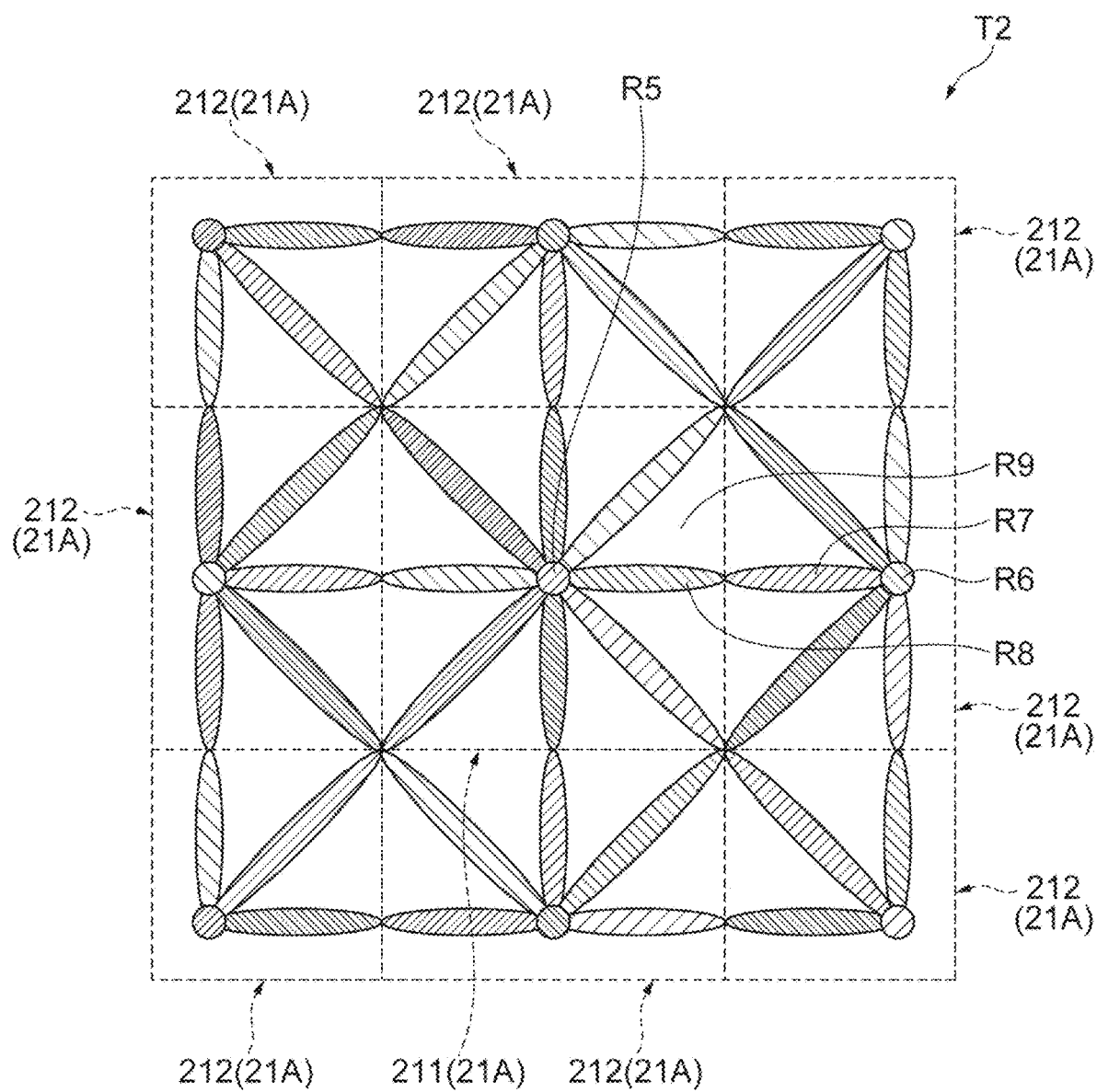
FIG. 4 is a view illustrating an example of a second table used in the radiation position detector illustrated in FIG. 2.

As illustrated in FIG. 4, each of the scintillator portion regions 21A has a square shape (here, although the shape is a square shape for simplicity, the shape is generally a quadrilateral or polygonal shape), and to one scintillator portion region 21A, eight scintillator portion regions 21A are adjacent in a row direction, a column direction, and two diagonal directions. Assuming that one scintillator portion region 21A shown at the center in FIG. 4 is referred to as a first scintillator portion region 211 and the eight scintillator portion regions 21A adjacent to the first scintillator portion region 211 are referred to as second scintillator portion regions 212 and focusing on the first scintillator portion region 211 and the second scintillator portion region 212 on the right thereof, in the second table T2, a fifth region R5, a sixth region R6, and a seventh region R7, and an eighth region R8 are shown as the second identification regions. The first scintillator portion region 211 corresponds to a first scintillator portion which is one of the plurality of scintillator portions 21. The second scintillator portion region 212 corresponds to a second scintillator portion which is adjacent to the first scintillator portion among the plurality of scintillator portions 21.

The fifth region R5 includes a distribution of the second centroid positions based on the scintillation light generated only by the segment 22 of the first scintillator portion, and corresponds to the first scintillator. The fifth region R5 has a circular shape and is located at the center of the first scintillator portion region 211. The sixth region R6 includes a centroid distribution of the second centroid positions based on the scintillation light generated only by the second scintillator portion and corresponds to the second scintillator portion. The sixth region R6 has a circular shape and is located at the center of the second scintillator portion region 212.

The seventh region R7 is located on the sixth region R6 side between the fifth region R5 and the sixth region R6, and corresponds to the first scintillator portion. The seventh region R7 has an elongated shape with a direction along the straight line connecting the fifth region R5 and the sixth region R6 as the longitudinal direction thereof. The seventh region R7 is located on the straight line connecting the fifth region R5 and the sixth region R6 and is included in the second scintillator portion region 212. The eighth region R8 is located on the fifth region R5 side between the fifth region. R5 and the sixth region R6, and corresponds to the second scintillator portion. The eighth region R8 has an elongated shape with the direction along the straight line connecting the fifth region R5 and the sixth region R6 as the longitudinal direction thereof. The eighth region R8 is located on the straight line connecting the fifth region R5 and the sixth region R6 and is included in the first scintillator portion region 211.

The relationship between the fifth region R5, the sixth region R6, the seventh region R7, and the eighth region R8 described above is established between the first scintillator portion region 211 and each of the plurality of second scintillator portion regions 212 adjacent to the first scintillator portion region 211. In the first scintillator portion region 211, a plurality of the seventh regions R7 respectively corresponding to a plurality of the second scintillator portions are separated from each other by regions R9. In the second table T2, even when any one scintillator portion region 21A is regarded as the first scintillator portion region 211, the relationship between the fifth region R5, the sixth region R6, the seventh region R7, and the eighth region R8 described above is established.

The specifying unit 50 determines the region in the first table T1 where the first centroid position calculated by the calculation unit 40 is located. In addition, the specifying unit 50 specifies the segment 22 corresponding to the region where the first centroid position is located as the segment 22 that initially generates the scintillation light. In the example illustrated in FIG. 3A, in a case where the first centroid position is located in the first region R1 or the third region R3, the specifying unit 50 specifies the first segment as the segment 22 that initially generates the scintillation light. On the other hand, in a case where the first centroid position is located in the second region R2, the specifying unit 50 specifies the second segment as the segment 22 that initially generates the scintillation light. In a case where the first centroid position is located in the fourth region R4, the specifying unit 50 may specify the first segment as the segment 22 that initially generates the scintillation light, or may not specify the segment 22 that initially generates the scintillation light but treat the fourth region R4 as the background.

The specifying unit 50 determines the region in the second table T2 where the second centroid position calculated by the calculation unit 40 is located. In addition, the specifying unit 50 specifies the scintillator portion 21 corresponding to the region where the second centroid position is located as the scintillator portion 21 having the segment 22 that initially generates the scintillation light. In the example illustrated in FIG. 4, in a case where the second centroid position is located in the fifth region R5 or the seventh region R7, the specifying unit 50 specifies the first scintillator portion as the scintillator portion 21 having the segment 22 that initially generates the scintillation light. On the other hand, in a case where the second centroid position is located in the sixth region R6 or the eighth region R8, the specifying unit 50 specifies the second scintillator portion as the scintillator portion 21 having the segment 22 that initially generates the scintillation light. In a case where the second centroid position is located in the region R9, the specifying unit 50 does not specify the scintillator portion 21 having the segment 22 that initially generates the scintillation light but treat the region R9 as the background.

The storage unit 60 is electrically connected to the specifying unit 50. The storage unit 60 is configured as a storage medium represented by, for example, a Read-only Memory (ROM) or a Random-Access Memory (RAM). The storage unit 60 stores, for example, the first table T1, the second table T2, and other information.

Figure 5:
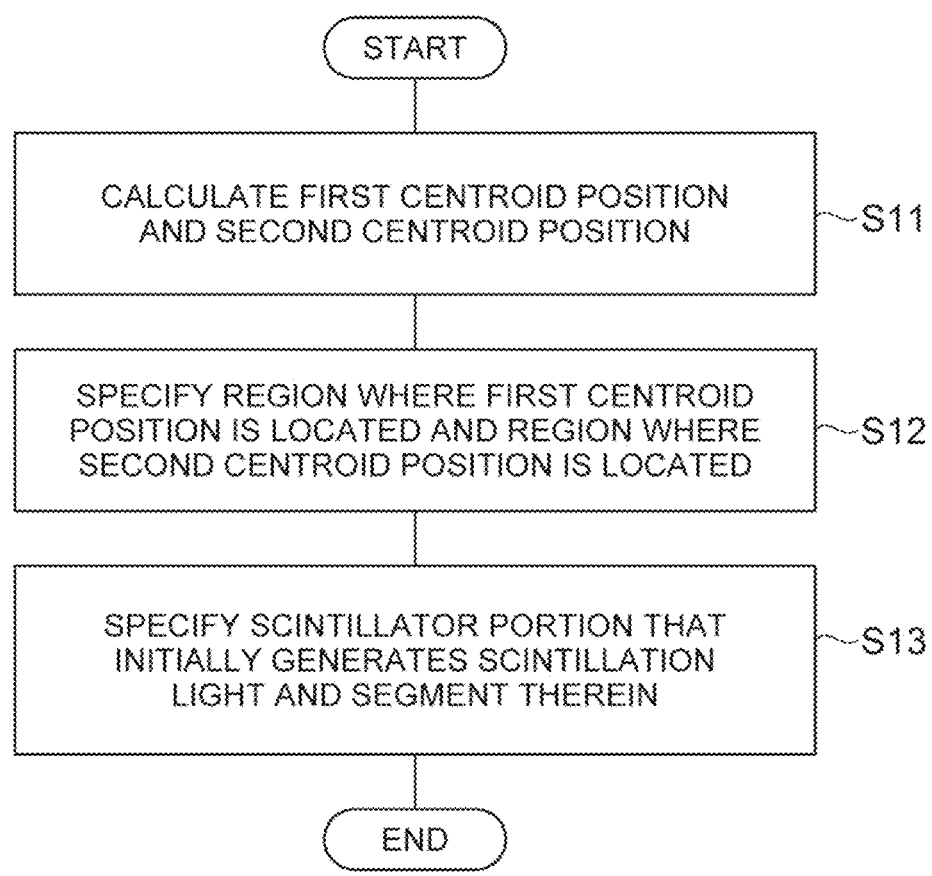
FIG. 5 is an example of a flowchart showing a radiation position detection method of the embodiment.

Next, a radiation position detection method performed by the radiation position detector 10 will be described with reference to FIG. 5.

First, the calculation unit 40 calculates the first centroid position in the Z-axis direction and the second centroid position on the XY plane, on the basis of the electrical signals A1, A2, A3, and A4 extracted by the first output extraction portion 33 and the electrical signals B1, B2, B3, and B4 extracted by the second output extraction portion 35 (first step, S11). Specifically, as described above, the calculation unit 40 calculates the ratio F1 from the electrical signals A1, A2, A3, and A4 and the electrical signals B1, B2, B3, and B4 using Formula (1) or (2), and calculates the first centroid position on the basis of the ratio F1. In addition, as described above, the calculation unit 40 calculates the ratio F2 and the ratio F3 from the electrical signals A1, A2, A3, and A4 and the electrical signals B1, B2, B3, and B4 using Formulas (3) and (4), or Formulas (5) and (6), and calculates the second centroid position on the basis of the ratio F2 and the ratio F3.

Next, the specifying unit 50 determines the region in the first table T1 where the first centroid position calculated by the calculation unit 40 is located, and determines the region in the second table T2 where the second centroid position is located (second step S12). In addition, the specifying unit 50 specifies the scintillator portion 21 which corresponds to the region where the second centroid position is located and initially generates the scintillation light, and specifies the segment 22 corresponding to the region where the first centroid position is located in the scintillator portion 21 as the segment 22 that initially generates the scintillation light (second step, S13).

Specifically, as described above, in a case where the first centroid position is located in the first region R1 or the third region R3, the specifying unit 50 specifies the first segment as the segment 22 that initially generates the scintillation light. On the other hand, in a case where the first centroid position is located in the second region R2, the specifying unit 50 specifies the second segment as the segment 22 that initially generated the scintillation light. In a case where the first centroid position is located in the fourth region R4, the specifying unit 50 specifies the first segment as the segment 22 that initially generates the scintillation light, or may not specify the segment 22 that initially generates the scintillation light but treat the fourth region R4 as the background.

In addition, as described above, in a case where the second centroid position is located in the fifth region R5 or the seventh region R7, the specifying unit 50 specifies the first scintillator portion as the scintillator portion 21 having the segment 22 that initially generates the scintillation light. On the other hand, in a case where the second centroid position is located in the sixth region R6 or the eighth region R8, the second scintillator portion specifies the second scintillator portion as the scintillator portion 21 having the segment 22 that initially generates the scintillation light. In a case where the second centroid position is located in the region R9, the specifying unit 50 does not specify the scintillator portion 21 that initially generates the scintillation light but treat the region R9 as the background. In a case where the first table T1 is provided for each scintillator portion 21 and Compton scattering occurs in the same scintillator portion 21, in the second step S12, specifying unit 50 determines the region in the second table T2 where the second centroid position is located, and determines the region in the first table T1 where the first centroid position is located. That is, the specifying unit 50 specifies the scintillator portion 21 that initially generates the scintillation light using the second table T2, and thereafter specifies the segment 22 that initially generates the scintillation light in the scintillator portion 21 using the first table T1 corresponding to the scintillator portion 21.

The effects exhibited by the radiation position detector 10 and the PET apparatus 1 configured as described above, and the radiation position detection method performed by the radiation position detector 10 will be described together with the problems of the related art.

Figure 6:
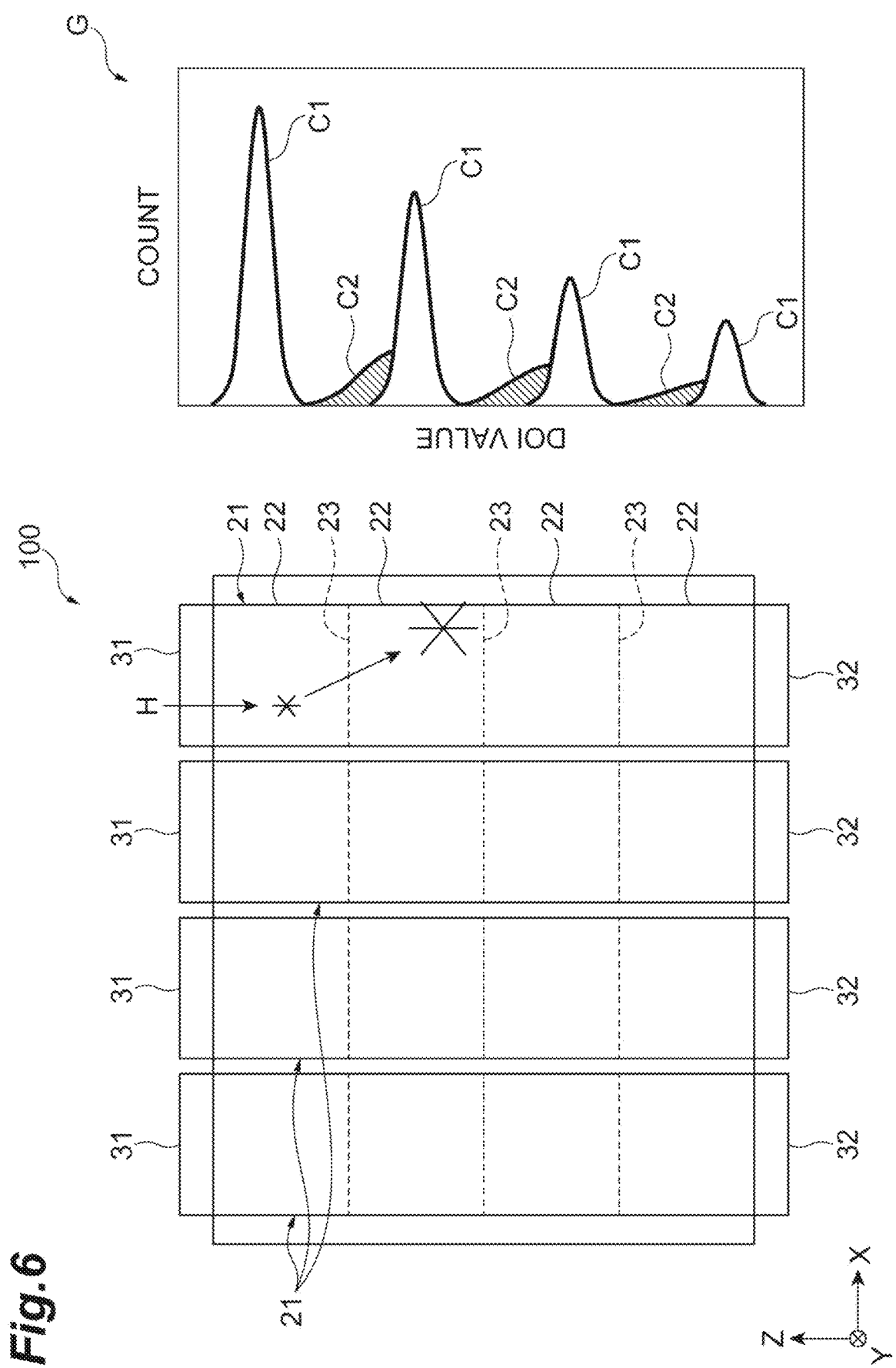
FIG. 6 is a view showing the relationship between a plurality of scintillator portions and a histogram of DOI values.

There may be cases where a radiation position detector based on the DOI technology is used in a PET (Positron Emission Tomography) apparatus or the like. As such a radiation position detector, for example, a radiation position detector 100 illustrated in FIG. 6 is known. The radiation position detector 100 includes a plurality of scintillator portions 21 having a plurality of segments 22 arranged along the Z-axis direction, a plurality of first light detectors 31 respectively arranged at one ends of the scintillator portions 21 in the Z-axis direction, and a plurality of second light detectors 32 disposed at the other ends of the scintillator portions 21 in the Z-axis direction. In the radiation position detector 100, when γ rays H are incident onto any of the plurality of segments 22, the segment 22 that initially generates the scintillation light is specified on the basis of the electrical signals output from each of the first light detectors 31 and each of the second light detectors 32. Specifically, first, the radiation position detector 100 calculates the first centroid position in the Z-axis direction regarding the position where the scintillation light is detected, on the basis of the electrical signals.

Here, the first centroid positions appear in distributions shown in the histogram G in FIG. 6. The vertical axis of the histogram G represents the count. The horizontal axis of the histogram G represents the DOI value (first centroid position). In the histogram G four distributions C1 and three distributions C2 (hatched parts in the histogram G in FIG. 6) that appear between the distributions C1 in the Z-axis direction are shown. The four distributions C1 respectively correspond to the four segments 22. In a case where scintillation light is generated by only one segment 22 among the segments 22, the first centroid position appears in the distribution C1 corresponding to that segment 22. On the other hand, as shown in FIG. 6, in a case where the γ rays H cause Compton scattering and photoelectric absorption in the two adjacent segments 22, the first centroid position tends to appear in the distribution C2.

Figure 7A:
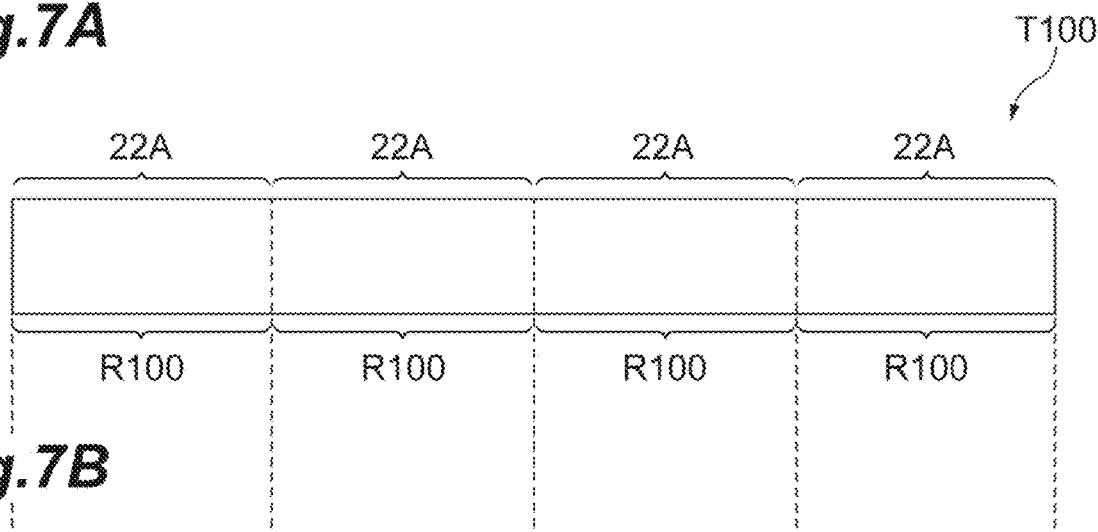
FIG. 7A is a view illustrating a first table in the related art.
Figure 7B:
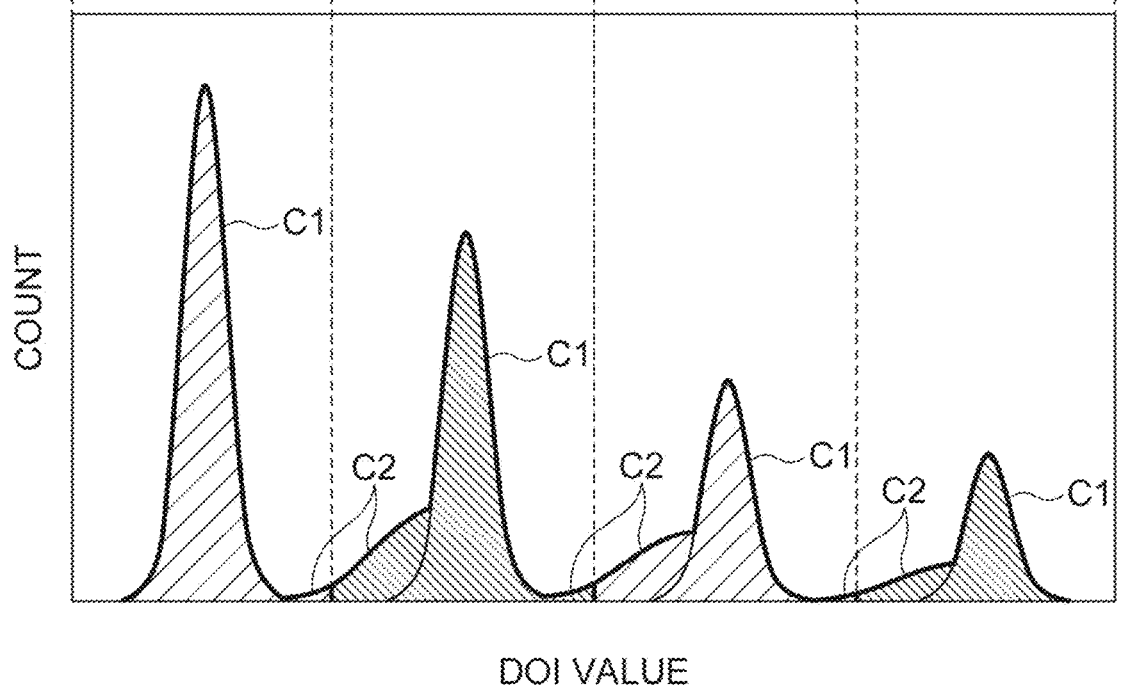
FIG. 7B is a view showing a histogram of DOI values.

Next, the radiation position detector 100 specifies the segment 22 that initially generates the scintillation light on the basis of the first centroid position and a first table T100 shown in FIG. 7A. In the first table T100 shown in FIG. 7A, for convenience of description, a plurality of the segment regions 22A respectively corresponding to a plurality of the segments 22 are shown. The first table T100 has four regions R100. The regions R100 are the first identification regions for individually identifying the segments 22 and respectively correspond to the segments 22. The difference between the first table T100 and the first table T1 of the embodiment is that each of the regions R100 is the first identification region of the first table T100. The segment regions 22A correspond to the arrangement of the segments arranged along the Z-axis direction. In the first table T100, each of the segment regions 22A and the corresponding region R100 are coincident with each other. Each of the segment regions 22A and each of the regions 8100 correspond to the horizontal axis of the DOI histogram shown in FIG. 7B. The boundary between the segment regions 22A of the first table T100 shown in FIG. 7A is located in the middle between the adjacent distributions C1 in the DOI histogram shown in FIG. 7B, and halves the distribution C2 appearing between the distributions C1. The boundary between the regions R100 is coincident with the boundary between the segment regions 22A. That is, each of the regions R100 is simply divided in the middle between the adjacent distributions C1. The radiation position detector 100 determines the region R100 of the first table T100 where the first centroid position is located. The radiation position detector 100 specifies the segment 22 corresponding to the region R100 where the first centroid position is located, as the segment 22 that initially generates the scintillation light.

However, in the first table T100, there may be a problem that in a case where γ rays H cause Compton scattering in any of the segments 22 and scintillation light is generated by two different scintillators, the segment 22 that initially generates scintillation light is erroneously specified. Hereinafter, in order to describe this problem, the characteristics of γ rays H that cause Compton scattering will be described.

Figure 8:
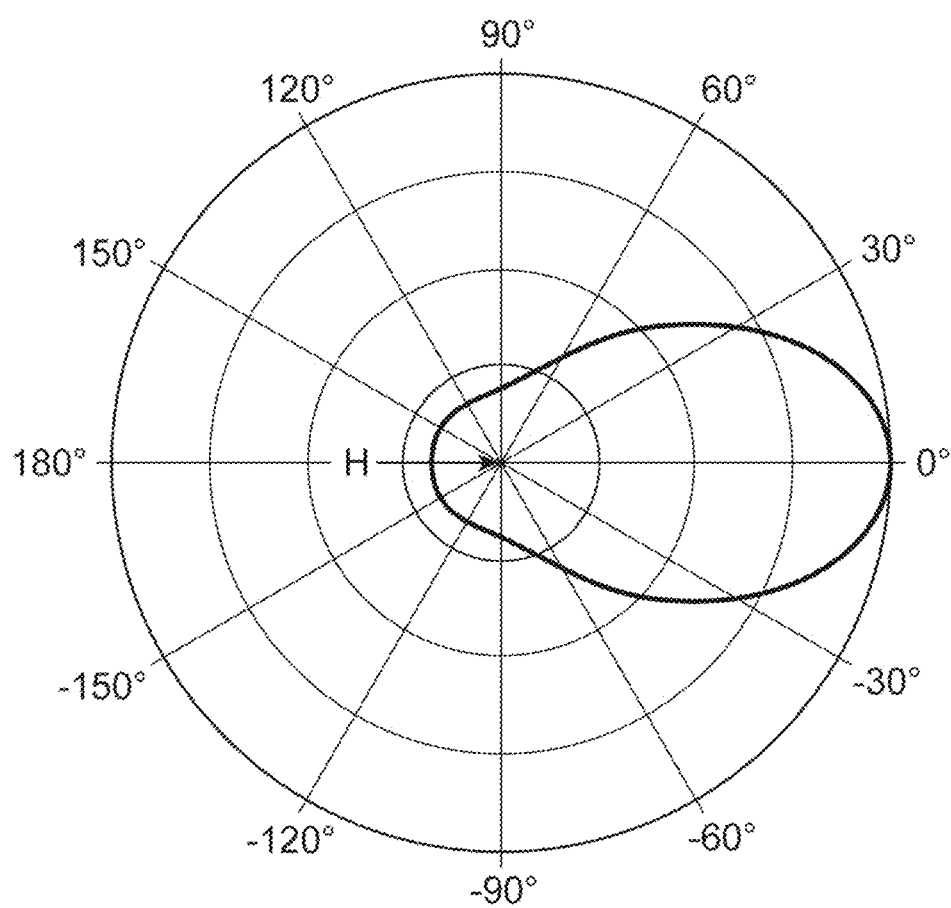
FIG. 8 is a view illustrating the directivity of Compton scattering.
Figure 9:
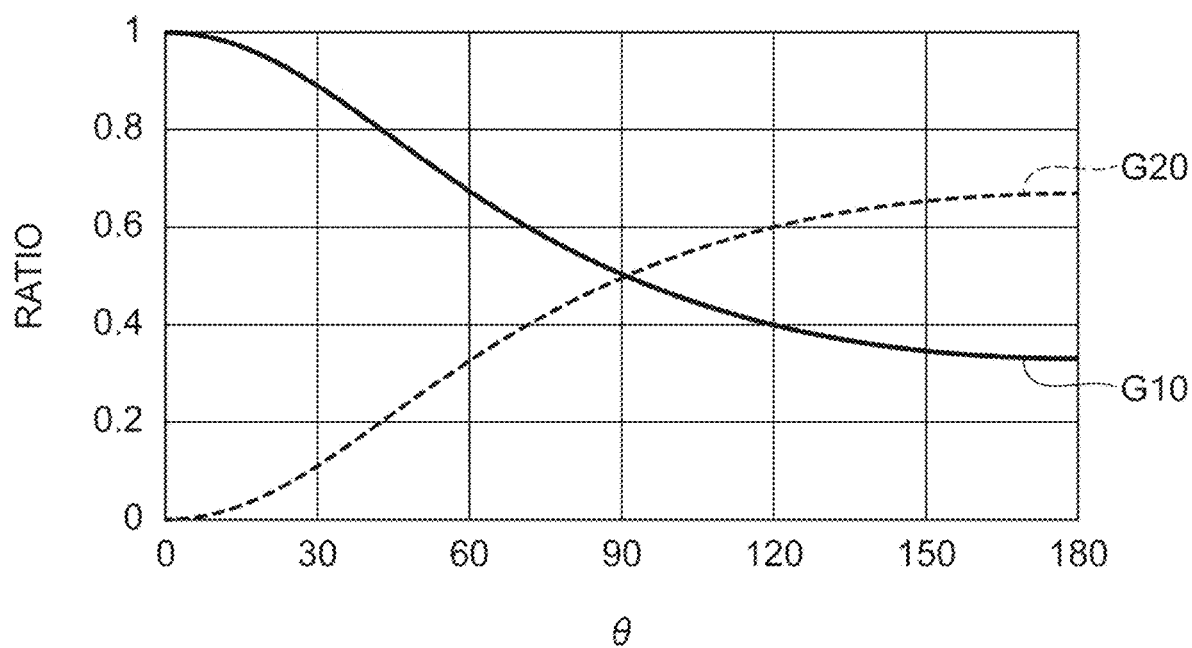
FIG. 9 is a view showing the relationship between a Compton scattering angle and energy values of scattered γ rays and recoil electrons.

As illustrated in FIG. 8, it can be seen that assuming that the angle of the traveling direction of γ rays H of 511 keV before scintillation light is initially generated is 0 degrees, the probability that the angle of the traveling direction of the γ rays H causing Compton scattering (that is, Compton scattering angle) with respect to the above angle will be 90 degrees or less is high. A case where the Compton scattering angle is less than 90 degrees is referred to as forward scattering. In FIG. 9, the graph G10 shows scattered γ ray energy $E_S$, and the graph G20 shows recoil electron energy $E_{RE}$ (that is, the energy exerted on the scattering point). In FIG. 9, the vertical axis represents the ratio between the scattered γ ray energy $E_S$ and the recoil electron energy $E_{RE}$, and the horizontal axis represents the Compton scattering angle θ. The scattered γ ray energy $E_S$ and the recoil electron energy $E_{RE}$ at the Compton scattering angle θ are obtained on the basis of the law of conservation of energy. As illustrated in FIG. 9, the scattered γ ray energy $E_S$ takes the maximum value when the Compton scattering angle is 0 degree (that is, when Compton scattering does not occur), decreases as the Compton scattering angle θ increases, and takes the minimum value when the Compton scattering angle is 180 degrees. On the other hand, the recoil electron energy $E_{RE}$ is minimized when the Compton scattering angle is 0 degrees, increases as the Compton scattering angle increases, and reaches the maximum value when the Compton scattering angle is 180 degrees. Therefore, it can be seen that in a case where γ rays H cause forward scattering and scintillation light is generated by the different segments 22, the intensity of the scintillation light generated after the scattering of the γ rays H tends to be higher than the intensity of the scintillation light initially generated.

Next, with reference to FIG. 7A again based on such characteristics of the γ rays H, the above-described problem (that is, the problem that the segment 22 that initially generates scintillation light is erroneously specified) will be described. In FIG. 7A, for example, a case where γ rays H cause Compton scattering in the segment 22 corresponding to the segment region on the leftmost side in the first table T100 and scintillation light is generated by each of the segment 22 and the segments 22 corresponding to the segment regions on the right side of the segment region is considered. Specifically, a case where scintillation light is initially generated by the segment 22 corresponding to the region R100 on the leftmost side and thereafter scintillation light is generated by the segment 22 corresponding to the region R100 on the right side of the region R100 on the leftmost side is considered. In this case, the first centroid position tends to be located in, other than the region 8100 on the leftmost side, the region R100 on the right side of the region R100 on the leftmost side. Therefore, there is concern that the radiation position detector 100 may erroneously specify the segment 22 corresponding to the region R100 on the right side as the segment 22 that initially generates the scintillation light.

Contrary to this, in the first table T1 of this embodiment, as illustrated in FIG. 3A, in a case where scintillation light is generated only by the first segment, since the first centroid position is located in the first region R1 corresponding to the first segment, the first segment is correctly specified as the segment 22 that initially generates the scintillation light. Similarly, even in a case where scintillation light is generated only by the second segment, the second segment is correctly specified as the segment 22 that initially generates the scintillation light. Here, when γ rays H cause Compton scattering in the first segment and scintillation light is generated by each of the first segment and the second segment, the intensity of the scintillation light generated by the second segment tends to be higher than the intensity of the scintillation light generated by the first segment. Therefore, the first centroid position tends to be located in the third region R3 located on the second region R2 side between the first region R1 and the second region R2. Even in this case, since the third region R3 corresponds to the first segment, the first segment is correctly specified as the segment 22 that initially generates the scintillation light. Therefore, with the radiation position detection method, the radiation position detector 10, and the PET apparatus 1 of this embodiment, the segment 22 that initially generates scintillation light can be accurately specified. That is, a one-dimensional position in the Z-axis direction where scintillation light is initially generated can be accurately specified.

Figure 10:
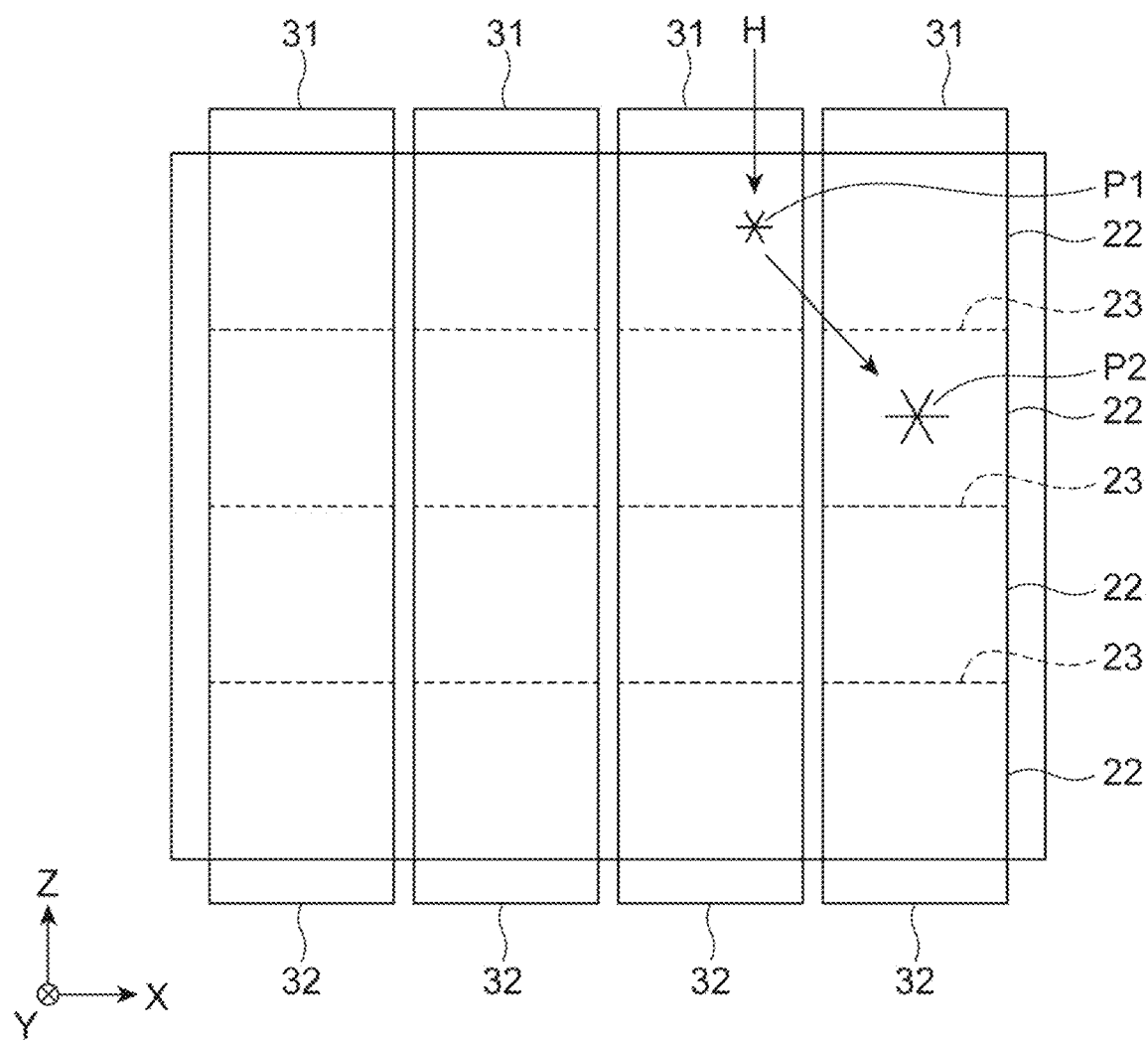
FIG. 10 is a view illustrating a form of forward scattering generated between scintillator portions adjacent to each other.

In a case where the first table T1 is provided for each of the scintillator portions 21 and Compton scattering occurs in the same scintillator portion 21, after the scintillator portion 21 that initially generates scintillation light is specified using the second table T2, the segment 22 that initially generates the scintillation light is specified in the scintillator portion 21 using the first table T1 corresponding to the scintillator portion 21, so that the segment 22 that initially generates the scintillation light can be more accurately specified. The reason is that since the distribution shape of the DOI histogram shown in FIG. 3B is different for each of the scintillator portions 21, an error may occur in the specification of the segment 22 when one first table T1 is used for the scintillator array 20. In a case where the first table T1 is provided for each of the scintillator portions 21, when Compton scattering occurs between the two adjacent scintillator portions 21 (see FIG. 10), the occurrence of an error in the specification of the segment 22 that initially generates scintillation light is considered depending on the first table T1 that is used.

As in this embodiment, in a case where the first centroid position is located in the fourth region R4, the specifying unit 50 specifies the first segment as the segment 22 that initially generates scintillation light, or does not specify the segment 22 that initially generates the scintillation light but treat the fourth region R4 as the background. For example, in a case where scintillation light is initially generated by the first segment, Compton scattering then occurs in the same first segment, and thereafter Compton scattering further occurs in the second segment, the first centroid position may be located in the fourth region R4. In this case, when the light amount of the scintillation light generated by the first segment is larger than the light amount of the scintillation light generated by the second segment, the first centroid position is located in the fourth region R4 located on the first region R1 side with respect to the second region R2. Even in this case, the first segment is correctly specified as the segment 22 that initially generates the scintillation light. That is, the segment 22 that initially generates the scintillation light can be more accurately specified.

In a case where Compton scattering occurs in the two segments 22 with one or more segments 22 interposed therebetween, it is difficult to specify the segment 22 that initially generates the scintillation light. For example, in a case where the first segment is interposed between a certain segment 22 and the second segment, when scintillation light is initially generated by the certain segment 22 and Compton scattering occurs in the second segment, the first centroid position may be located in the fourth region R4. In this case, it is difficult to specify the segment 22 that initially generates the scintillation light. In consideration of this case, in a case where the first centroid position is located in the fourth region R4, the specification of the segment 22 that initially generates the scintillation light is not performed, thereby suppressing erroneous specification of the segment 22 that initially generates the scintillation light. As a result, the segment 22 that initially generates the scintillation light can be more accurately specified.

On the other hand, in the PET apparatus 1 which is required to have high detection sensitivity, it is desirable that the ratio of an insensitive region to the γ rays in the first table T1 is as low as possible. Here, in a case where the first centroid position is located in the fourth region R4, the specifying unit 50 specifies the segment 22 that initially generates the scintillation light. Accordingly, compared to a case where the fourth region R4 is caused to be the insensitive region, the ratio of the insensitive region in the first table T1 can be caused to be as low as possible. As a result, a decrease in the detection sensitivity of the radiation position detector 10 and the PET apparatus 1 can be suppressed.

Figure 11:
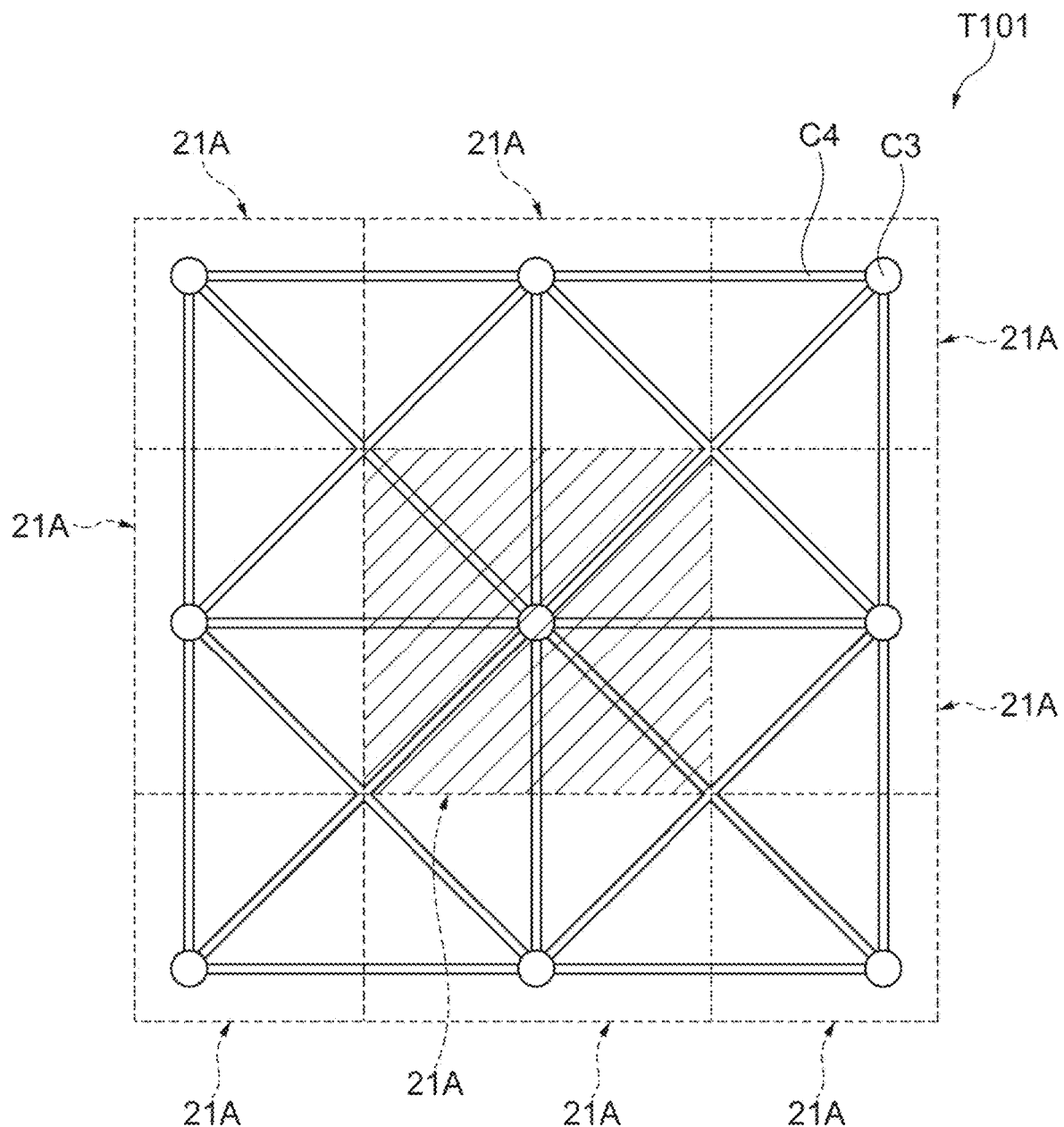
FIG. 11 is a view illustrating a second table in the related art.

As in this embodiment, in a case where the second centroid position is located in the fifth region R5 or the seventh region R7 of the second table T2, the specifying unit 50 may specify the first scintillator portion as the scintillator portion 21 having the segment 22 that initially generates the scintillation light, and in a case where the second centroid position is located in the sixth region R6 or the eighth region R8, the specifying unit 50 may specify the second scintillator portion as the scintillator portion 21 having the segment 22 that initially generates the scintillation light. In the radiation position detector 100 described above, as illustrated in FIG. 10, as γ rays H cause forward scattering in one scintillator portion 21, scintillation light may be generated by each of the one scintillator portion 21 and the scintillator portions 21 adjacent to the one scintillator portion 21 in the X-axis direction. That is, the scintillation light is initially generated at a point P1, and thereafter the scintillation light may be generated at a point P2. In this case, specification of the scintillator portion 21 having the segment 22 that generates the scintillation light based on the second centroid position and the second table T101 shown in FIG. 11 is considered. In FIG. 11, for ease of understanding, both circular distributions C3 and elongated distributions C4 as the distributions of the second centroid are shown.

Each of the circular distributions C3 is the distribution of the second centroid position based on scintillation light generated only by one scintillator portion 21. The circular distributions C3 are respectively included in the scintillator portion regions 21A. On the other hand, each of the elongated distributions C4 is the distribution of the second centroid position based on the scintillation light generated by the two adjacent scintillator portions 21. The elongated distributions C4 connect the adjacent circular distributions C3 in a lattice pattern or a cross pattern. As illustrated in FIG. 11, the boundary between the scintillator portion regions 21A is located in the middle between the circular distributions C3 adjacent to each other. The scintillator portion regions 21A are second identification regions for individually identifying the scintillator portions 21, and respectively correspond to the scintillator portions 21. The difference between the second table T101 and the second table T2 of the embodiment is that each of the scintillator portion regions 21A is the second identification region of the second table T101. Each of the scintillator portion regions 21A of the second table T101 is simply divided in the middle between the adjacent circular distributions C3. The radiation position detector 100 specifies the scintillator portion region 21A of the second table T101 where the second centroid position is located. The radiation position detector 100 specifies the scintillator portion 21 corresponding to the scintillator portion region 21A where the second centroid position is located, as the scintillator portion 21 having the segment 22 that initially generates the scintillation light. In a case where the second centroid position is included in the scintillator portion region 21A (a hatched part in FIG. 11) located at the center of the second table T101, the radiation position detector 100 specifies the scintillator portion 21 corresponding to the scintillator portion region 21A as the scintillator portion 21 having the segment 22 that initially generates the scintillation light.

However, as described above, since the intensity of the scintillation light generated after the scattering of the γ rays H tends to be higher than the intensity of the scintillation light initially generated, the following problems may be incurred. In FIG. 11, for example, a case where the γ rays H cause. Compton scattering in the scintillator portion region 21A at the center of the second table T101 (a hatched part) and scintillation light is generated by the scintillator portion 21 and the scintillator portion 21 corresponding to the scintillator portion region 21A on the right side of the scintillator portion region 21A at the center is considered. Specifically, a case where scintillation light is initially generated by the scintillator portion 21 corresponding to the scintillator portion region 21A at the center and thereafter scintillation light is generated by the scintillator portion 21 corresponding to the scintillator portion region 21A on the right side is considered. In this case, the second centroid position tends to be located in, other than the scintillator portion region 21A at the center, the scintillator portion region 21A on the right side of the scintillator portion region 21A at the center. Therefore, there is concern that the radiation position detector 100 may erroneously specify the scintillator portion 21 corresponding to the scintillator portion region 21A on the right side as the scintillator portion 21 having the segment 22 that initially generates the scintillation light. In a case of erroneous specification of the scintillator portion 21 having the segment 22 that initially generates the scintillation light, the following problems are incurred in a PET apparatus 200 illustrated in FIG. 12.

Figure 12:
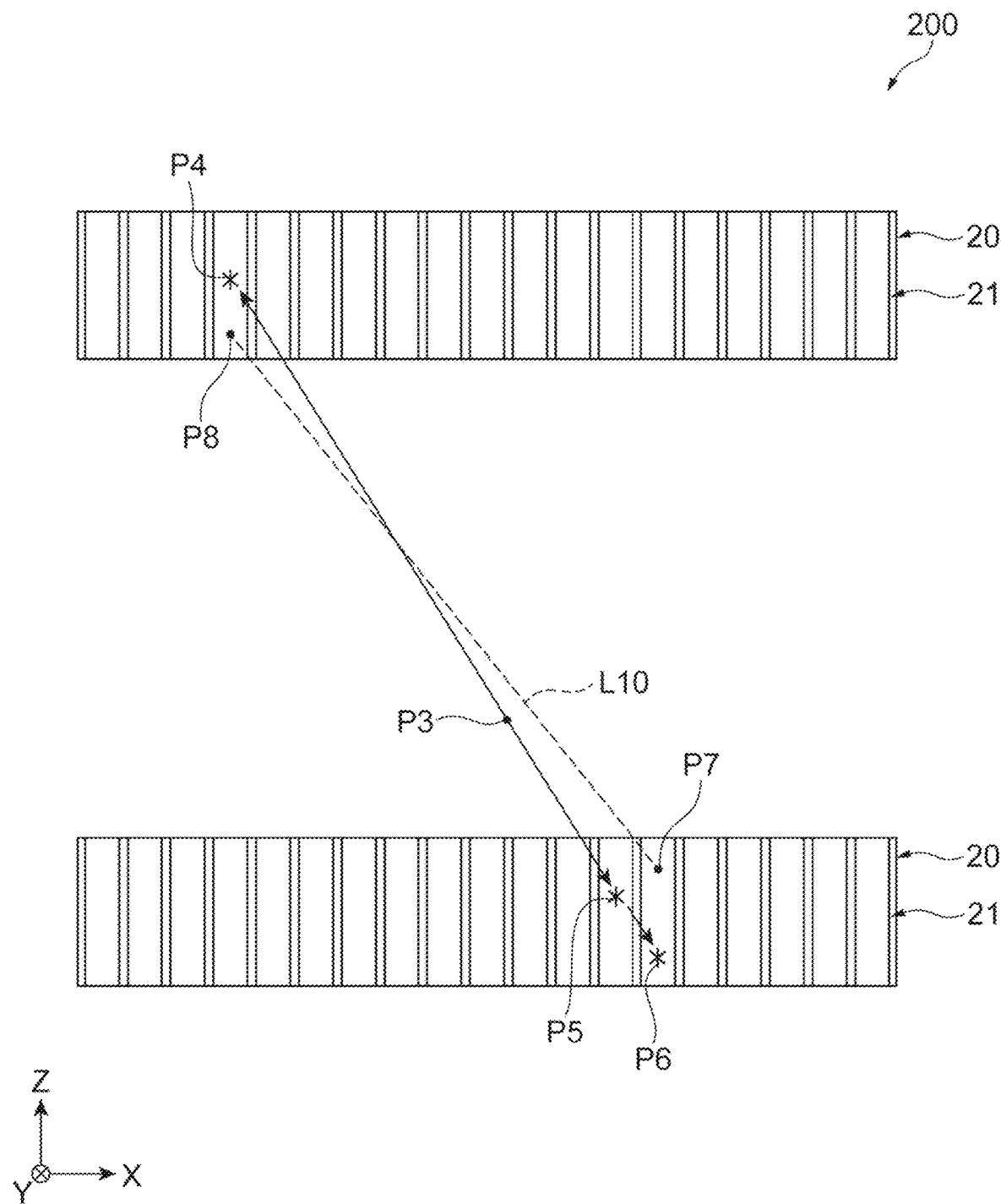
FIG. 12 is a view illustrating effects of erroneous specification of a scintillator portion in the PET apparatus.

In FIG. 12, a pair of scintillator arrays 20 included in the PET apparatus 200 are disposed at positions opposing each other with a point P3 interposed therebetween in the Z-axis direction. As illustrated in FIG. 12, one annihilation event occurs at the point P3 and a pair of γ rays H emitted in opposite directions are generated. One γ ray H of the pair of γ rays H arrives at a point P4 of one scintillator array 20. In the scintillator array 20, scintillation light is generated only at the point P4. The other γ ray H arrive at a point P5 of the other scintillator array 20 and causes Compton scattering. The scintillator portion 21 located at the point P4 and the scintillator portion 21 located at the point P5 are adjacent to each other. In the scintillator array 20, scintillation light is generated at each of the point P5 and a point P6. In this case, as described above, since the second centroid position tends to be located at a point P7 closer to the point P6 than the point P5 in the X-axis direction, the scintillator portion 21 including the point P7 is specified at the scintillator portion 21 having the segment 22 that initially generates the scintillation light. As a result, the PET apparatus 200 erroneously specifies that the annihilation event had occurred on a straight line L10 connecting the point P7 and a point P8.

Contrary to this, in the second table T2 of this embodiment, as illustrated in FIG. 4, in a case where scintillation light is generated only by the first scintillator portion, since the second centroid position on the XY plane regarding the position where the scintillation light is detected is located at the fifth region R5 corresponding to the first scintillator portion, the first scintillator portion is correctly specified as the scintillator portion 21 having the segment 22 that initially generates the scintillation light. Similarly, even in a case where scintillation light is generated only by the second scintillator portion, the second scintillator portion is correctly specified as the scintillator portion 21 having the segment 22 that initially generates the scintillation light. Here, when radiation causes Compton scattering in the first scintillator portion and scintillation light is generated by each of the first scintillator portion and the second scintillator portion, the intensity of the scintillation light generated by the second scintillator portion tends to be higher than the intensity of the scintillation light generated by the first scintillator portion. Therefore, the second centroid position tends to be located in the seventh region R7 located on the sixth region R6 side between the fifth region R5 and the sixth region R6. Even in this case, since the seventh region R7 corresponds to the first scintillator portion, the first scintillator portion is correctly specified as the scintillator portion 21 having the segment 22 that initially generates the scintillation light. Similarly, even in a case where radiation causes Compton scattering in the second scintillator portion and scintillation light is generated by each of the first scintillator portion and the second scintillator portion, the second scintillator portion is correctly specified as the scintillator portion 21 having the segment 22 that initially generates the scintillation light. Accordingly, the scintillator portion 21 having the segment 22 that initially generates the scintillation light on the XY plane can be accurately specified. That is, a two-dimensional position where the scintillation light is initially generated on the XY plane can be accurately specified.

As in this embodiment, the light shielding layer 25 that shields scintillation light may be provided between the plurality of scintillator portions 21 on the XY plane. Accordingly, for example, a leak of scintillation light from the first scintillator portion that generates the scintillation light into the second scintillator portion can be prevented, and thus the scintillator portion 21 that initially generates the scintillation light can be more accurately specified.

As in this embodiment, on the XY plane, each of the plurality of first light detectors 31 may be connected to the first resistor chain 34, and each of the plurality of second light detectors 32 may be connected to the second resistor chain 36. Accordingly, each of the first centroid position and the second centroid position can be easily and accurately calculated.

As in this embodiment, the light scattering portion 23 formed through laser irradiation may be provided between the plurality of segments 22 in the Z-axis direction. Accordingly, for example, compared to a case where each of the scintillator portions 21 is configured by joining a plurality of scintillator blocks to each other while allowing light scattering members, or members having different optical properties (for example, refractive indices) from the scintillator portion 21 to be interposed therebetween, each of the scintillator portions 21 can be manufactured easily and with high dimensional accuracy.

The radiation position detection method, the radiation position detector, and the PET apparatus according to this disclosure are not limited to the above-described embodiment, and various other modifications can be made. For example, in the above-described embodiment, the light shielding layer 25 is provided between the plurality of scintillator portions 21. However, the light shielding layer 25 may not be provided. In the above-described embodiment, γ rays are detected as the radiation. However, the radiation to be detected is not limited to the γ rays. The radiation may be, for example, X-rays. In the embodiment described above, the scintillator portion 21 is configured the segments 22 divided by the light scattering portions 23 formed through laser irradiation. However, the scintillator portion may also be configured by joining a plurality of scintillator blocks to each other while allowing light scattering members, or members having different optical properties (for example, refractive indices) from the scintillator portion 21 to be interposed therebetween, or by joining scintillator blocks having different light emission decay times. In the above-described embodiment, the radiation position detector 10 is applied to the PET apparatus 1. However, the radiation position detector 10 may also be applied to a Compton camera, for example. In the above-described embodiment, in a case where the first centroid position is located in the fourth region R4 in the first table T1, the specifying unit 50 specifies the segment 22 that initially generates the scintillation light. However, in a case where the first centroid position is located in the fourth region R4, the specification of the segment 22 that initially generates the scintillation light may not be performed. In the above-described embodiment, the specification of the segment 22 that initially generates the scintillation light is performed using both the first table T1 and the second table T2. However, the specification of the segment 22 that initially generates the scintillation light may be performed only using the first table T1. For example, in a case where the scintillator array 20 has a layer that shields γ rays instead of the light shielding layer 25, there is no need to specify the scintillator portion 21 using the second table T2, and the segment 22 may be specified using only the first table T1.

What is claimed is:

1. A radiation position detection method performed by a radiation position detector including a plurality of scintillator portions which have a plurality of segments that are arranged along an incident direction of radiation and absorb the radiation and generate scintillation light, and are two-dimensionally arranged on a plane intersecting the incident direction, and a plurality of light detectors which are arranged to correspond to the plurality of scintillator portions and output electrical signals in response to an intensity of the scintillation light, the method comprising:
   a first step of calculating a first centroid position in the incident direction regarding positions where the scintillation light is detected, on the basis of the electrical signals; and
   a second step of specifying, on the basis of a first table showing first identification regions for identifying the plurality of segments, and the first centroid position, the segment that initially generates the scintillation light,
   wherein the first identification region includes
      a first region corresponding to a first segment which is one of the plurality of segments,
      a second region corresponding to a second segment adjacent to the first segment among the plurality of segments, on a side opposite to an incident side of the radiation with respect to the first segment, and
      a third region that is located on the second region side between the first region and the second region and corresponds to the first segment, and
   in the second step, in a case where the first centroid position is located in the first region or the third region, the first segment is specified as the segment that initially generates the scintillation light, and in a case where the first centroid position is located in the second region, the second segment is specified as the segment that initially generates the scintillation light.

2. The radiation position detection method according to claim 1,
   wherein the first table further includes a fourth region located on the first region side between the first region and the second region, and
   in the second step, in a case where the first centroid position is located in the fourth region, the first segment is specified as the segment that initially generates the scintillation light, or specification of the segment that initially generates the scintillation light is not performed.

3. The radiation position detection method according to claim 1,
   wherein, in the first step, a second centroid position on the plane is calculated regarding the positions where the scintillation light is detected, on the basis of the electrical signals,
   in the second step, the scintillator portion having the segment that initially generates the scintillation light is specified on the basis of a second table showing second identification regions for identifying the plurality of scintillator portions and the second centroid position,
   the second identification region includes
      a fifth region corresponding to a first scintillator portion which is one of the plurality of scintillator portions,
      a sixth region corresponding to a second scintillator portion adjacent to the first scintillator portion among the plurality of scintillator portions,
      a seventh region which is located on the sixth region side between the fifth region and the sixth region and corresponds to the first scintillator portion, and an eighth region which is located on the fifth region side between the fifth region and the sixth region and corresponds to the second scintillator portion, and in the second step, in a case where the second centroid position is located in the fifth region or the seventh region, the first scintillator portion is specified as the scintillator portion having the segment that initially generates the scintillation light, and in a case where the second centroid position is located in the sixth region or the eighth region, the second scintillator portion is specified as the scintillator portion having the segment that initially generates the scintillation light.

4. The radiation position detection method according to claim 2, wherein, in the first step, a second centroid position on the plane is calculated regarding the positions where the scintillation light is detected, on the basis of the electrical signals, in the second step, the scintillator portion having the segment that initially generates the scintillation light is specified on the basis of a second table showing second identification regions for identifying the plurality of scintillator portions and the second centroid position, the second identification region includes
a fifth region corresponding to a first scintillator portion which is one of the plurality of scintillator portions,
a sixth region corresponding to a second scintillator portion adjacent to the first scintillator portion among the plurality of scintillator portions,
a seventh region which is located on the sixth region side between the fifth region and the sixth region and corresponds to the first scintillator portion, and
an eighth region which is located on the fifth region side between the fifth region and the sixth region and corresponds to the second scintillator portion, and in the second step, in a case where the second centroid position is located in the fifth region or the seventh region, the first scintillator portion is specified as the scintillator portion having the segment that initially generates the scintillation light, and in a case where the second centroid position is located in the sixth region or the eighth region, the second scintillator portion is specified as the scintillator portion having the segment that initially generates the scintillation light.

5. The radiation position detection method according to claim 1, wherein a light shielding layer that shields the scintillation light is provided between the plurality of scintillator portions.

6. The radiation position detection method according to claim 2, wherein a light shielding layer that shields the scintillation light is provided between the plurality of scintillator portions.

7. The radiation position detection method according to claim 1, wherein each of the plurality of light detectors is connected to a resistor chain.

8. The radiation position detection method according to claim 2, wherein each of the plurality of light detectors is connected to a resistor chain.

9. The radiation position detection method according to claim 1, wherein a light scattering portion formed through laser irradiation is provided between the plurality of segments.

10. The radiation position detection method according to claim 2, wherein a light scattering portion formed through laser irradiation is provided between the plurality of segments.

11. A radiation position detector comprising:

a plurality of scintillator portions which have a plurality of segments that are arranged along an incident direction of radiation and absorb the radiation and generate scintillation light, and are two-dimensionally arranged on a plane intersecting the incident direction;
a plurality of light detectors which are arranged to correspond to the plurality of scintillator portions and output electrical signals in response to an intensity of the scintillation light;
a calculation unit which calculates a first centroid position in the incident direction regarding positions where the scintillation light is detected, on the basis of the electrical signals; and
a specifying unit which specifies the segment that initially generates the scintillation light, on the basis of a first table showing first identification regions for identifying the plurality of segments, and the first centroid position, wherein the first identification region includes
a first region corresponding to a first segment which is one of the plurality of segments,
a second region corresponding to a second segment adjacent to the first segment among the plurality of segments, on a side opposite to an incident side of the radiation with respect to the first segment,
a third region that is located on the second region side between the first region and the second region and corresponds to the first segment, and in a case where the first centroid position is located in the first region or the third region, the specifying unit specifies the first segment as the segment that initially generates the scintillation light, and in a case where the first centroid position is located in the second region, the specifying unit specifies the second segment as the segment that initially generates the scintillation light.

12. The radiation position detector according to claim 11, wherein the first table further includes a fourth region which is located on the first region side between the first region and the second region, and corresponds to the second segment, and in a case where the first centroid position is located in the fourth region, the specifying unit specifies the second segment as the segment that initially generates the scintillation light.

13. The radiation position detector according to claim 11, wherein the calculation unit calculates a second centroid position on the plane regarding the positions where the scintillation light is detected, on the basis of the electrical signals, the specifying unit specifies the scintillator portion having the segment that initially generates the scintillation light, on the basis of a second table showing second identification regions for identifying the plurality of scintillator portions and the second centroid position, the second identification region includes
a fifth region corresponding to a first scintillator portion which is one of the plurality of scintillator portions,
a sixth region corresponding to a second scintillator portion adjacent to the first scintillator portion among the plurality of scintillator portions, a seventh region which is located on the sixth region side between the fifth region and the sixth region and corresponds to the first scintillator portion, and an eighth region which is located on the fifth region side between the fifth region and the sixth region and corresponds to the second scintillator portion, and in a case where the second centroid position is located in the fifth region or the seventh region, the specifying unit specifies the first scintillator portion as the scintillator portion having the segment that initially generates the scintillation light, and in a case where the second centroid position is located in the sixth region or the eighth region, the specifying unit specifies the second scintillator portion as the scintillator portion having the segment that initially generates the scintillation light.

14. The radiation position detector according to claim 12, wherein the calculation unit calculates a second centroid position on the plane regarding the positions where the scintillation light is detected, on the basis of the electrical signals, the specifying unit specifies the scintillator portion having the segment that initially generates the scintillation light, on the basis of a second table showing second identification regions for identifying the plurality of scintillator portions and the second centroid position, the second identification region includes a fifth region corresponding to a first scintillator portion which is one of the plurality of scintillator portions, a sixth region corresponding to a second scintillator portion adjacent to the first scintillator portion among the plurality of scintillator portions, a seventh region which is located on the sixth region side between the fifth region and the sixth region and corresponds to the first scintillator portion, and an eighth region which is located on the fifth region side between the fifth region and the sixth region and corresponds to the second scintillator portion, and in a case where the second centroid position is located in the fifth region or the seventh region, the specifying unit specifies the first scintillator portion as the scintillator portion having the segment that initially generates the scintillation light, and in a case where the second centroid position is located in the sixth region or the eighth region, the specifying unit specifies the second scintillator portion as the scintillator portion having the segment that initially generates the scintillation light.

15. A PET apparatus comprising:
the radiation position detector according to claim 11.
16. A PET apparatus comprising:
the radiation position detector according to claim 12.
17. A PET apparatus comprising:
the radiation position detector according to claim 13.
18. A PET apparatus comprising:
the radiation position detector according to claim 14.

* * * * *